Sept. 20, 1966     W. H. WRIGHT     3,273,223
CUTTING TOOLS
Filed Feb. 19, 1964     3 Sheets-Sheet 1
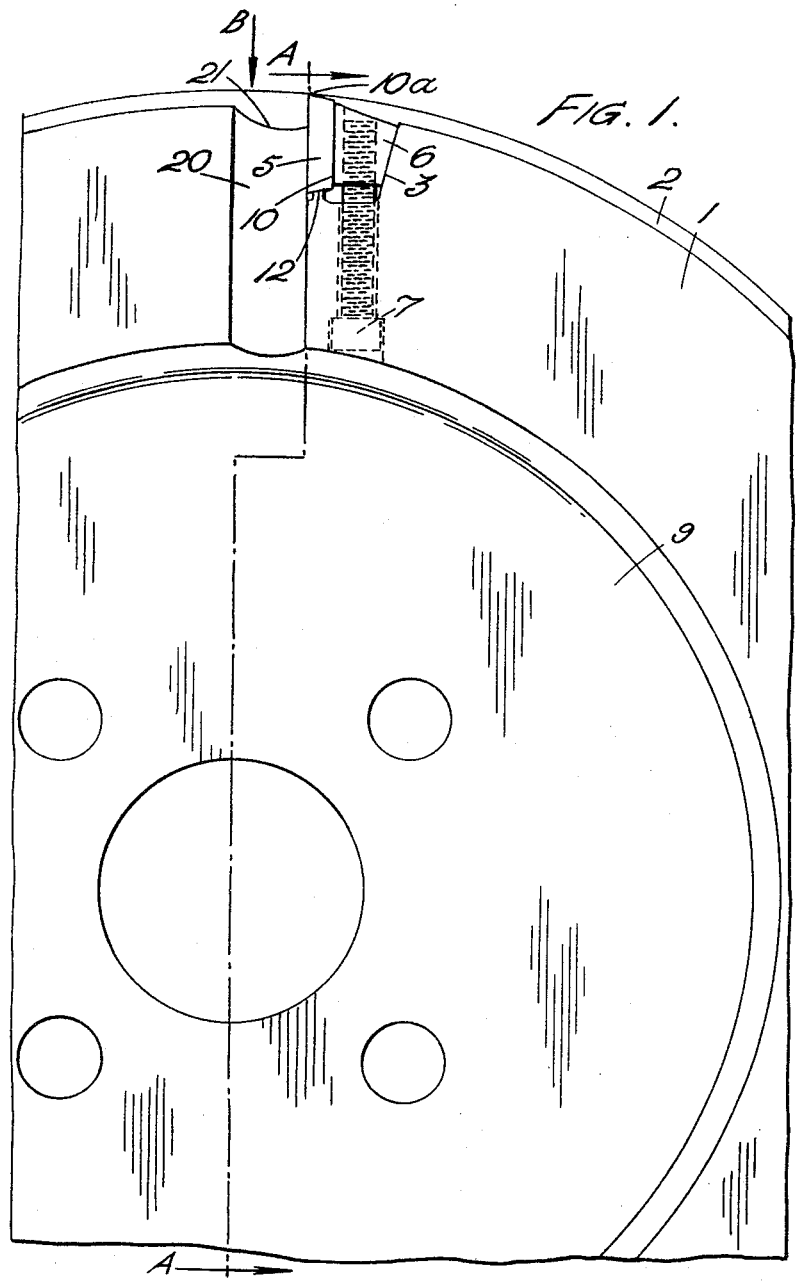
Inventor
Walter Henry Wright

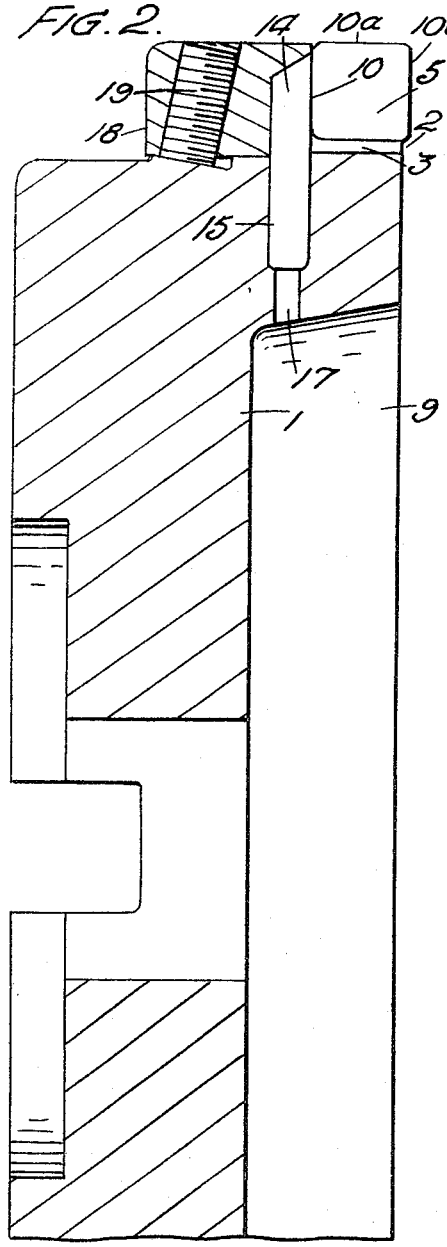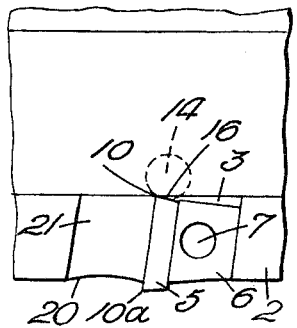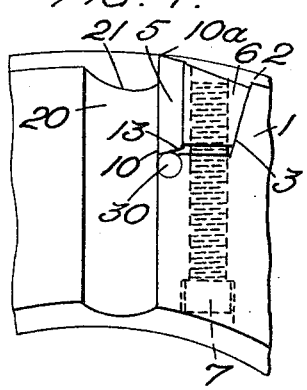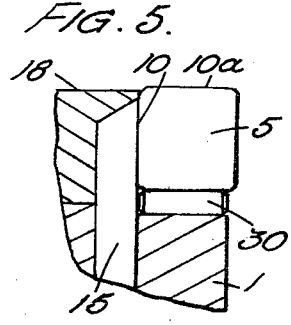

Sept. 20, 1966　　　　W. H. WRIGHT　　　　3,273,223
CUTTING TOOLS
Filed Feb. 19, 1964　　　　　　　　　　　　3 Sheets-Sheet 3
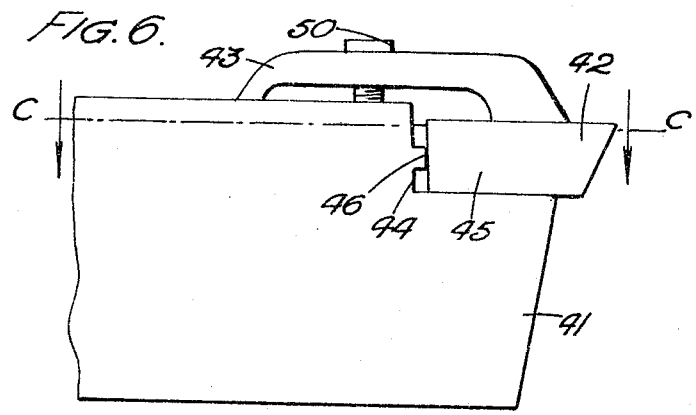
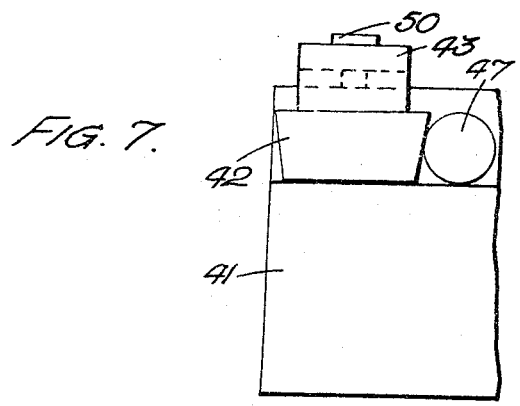
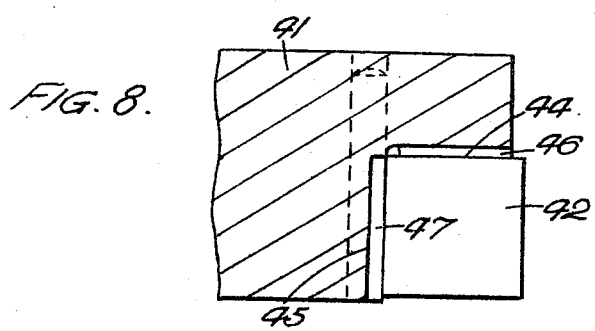
Inventor
Walter Henry Wright
By Hooper, Leonard & Buell
his attorneys

3,273,223

CUTTING TOOLS

Walter Henry Wright, Sheffield, England, assignor to Firth Brown Tools Limited, Yorkshire, England, a British company
Filed Feb. 19, 1964, Ser. No. 346,033
Claims priority, application Great Britain, Feb. 19, 1964, 6,708/63
2 Claims. (Cl. 29—105)

The invention relates to cutting tools, for example milling cutters, single-point tools, boring bars, and provides a cutting tool consisting of a body and at least one separately constructed cutting blade held in a slot in the body, there being along at least one side of the blade a cutting edge which projects from the body, the blade being located as to the projection of the said cutting edge, by a separately constructed stop or pillar attached to the body and supporting a side of the blade other than that having the said cutting edge projecting from the body.

In one form of the invention the body is a rotatable body having a peripheral rib around the body and in which there are a plurality of blades located in slots in the peripheral rib, such that for each blade a cutting edge projects from one side of the rib and the respective stop or pillar projects from the body adjacent the opposite side of the rib and engages the side of the blade which is at said opposite side of the rib.

In this form of the invention the blades may be located in the radial direction by engagement with the bottoms of the slots, each slot preferably extending in the axial direction completely through the rib thereby facilitating the accurate machining of the slots and especially the bottom surfaces to provide accurate location of the blades.

In another form of the invention the tool has only a single blade which is located in a slot provided on an outside surface of the body, such that a cutting edge of the blade projects from one side of the slot and the stop or pillar projects from the body adjacent the opposite side of the slot and engages the side of the blade which is at said opposite side of the slot. In this other form of the invention the blade may be located in one direction by engagement with the bottom of the slot.

The invention is particularly concerned with cutting tools described above in which the cutting blade has a reserve cutting edge which does not, when in reserve, project from the body for cutting purposes and in which clamping means is provided such that the reserve cutting edge can be brought into cutting position and interchanged with the cutting edge previously in the cutting position by rotation of the blade, usually in its own plane, after release of the clamping means. The means of accurate location provided by the invention facilitate the exact positioning of such interchanged edges. If such a reserve edge lies along a side which is supported by the said stop or pillar, or by the bottom of the slot, it is preferred that such support means engages that side at a position apart from such edge in order to avoid damage to the edge. For example the support means may engage the side along the centre portion of the width of the side.

The bottom of the slot may be provided with an upstanding rib which supports and engages the said side of the blade at a position apart from said reserve edge. Alternatively the said side of the blade may be supported and engaged by a pin held firmly within the body of the tool and located at the bottom of the said slot.

A specific example of a face and edge milling cutter, a modification thereof, and also one example of a single point tool according to the invention, will now be described with reference to the drawings in which:

FIGURE 1 is a front view of a face and edge milling cutter,

FIGURE 2 is a section on the line A—A in FIGURE 1,

FIGURE 3 is a view in the direction B in FIGURE 1,

FIGURE 4 is a view similar to part of FIGURE 1 showing the modification,

FIGURE 5 is a view similar to FIGURE 2 showing the modification,

FIGURE 6 shows a side elevation of a single point cutting tool,

FIGURE 7 shows an end elevation of the tool shown in FIGURE 6, and

FIGURE 8 shows a modification of the tool shown in FIGURES 6 and 7 and is a section on the line C—C in FIGURE 6.

The cutter shown in FIGURES 1–5 comprises a rotatable body 1 with a peripheral rib 2 in which are machined, at intervals around the rib, through slots 3. Held in these slots there are square cutter blades 5 (e.g. of hard metal or carbide or of high speed steel). The blades are held by wedges 6 and clamping screws 7, access to the screws being obtained at the inside of a recess 9 in the body. Each blade has, along each of the four sides, a sharpened edge 10, 10a. The edges 10a project from one side face and the periphery of the rib and act, for the time being, as the cutting edges. The blades may be released by loosening the wedges 6 and may then be rotated to interchange the reserve cutting edges 10 for the cutting edges 10a.

The blades are located in the slots in respect of the extent of projection of the cutting edges 10a as follows. The bottom of each slot is formed with an upstanding rib 12 which extends the full axial length of the slot and is accurately machined in respect of its radial distance from the centre of the body. The side 13 of the blade seats on this rib, the rib engaging and supporting only the centre portions of the width of the side thereby avoiding damage to the cutting edge. In this way the circumferential cutting edge 10a is accurately located and the accuracy is maintained when the blade is rotated to bring another of its four sides to the circumferential cutting position.

Projecting substantially radially from the body adjacent the inner end of each slot there is a stop or pillar 14 removably held in a socket 15 in the body. This pillar serves to support and locate the side 16 of the blade and hence to locate the radial cutting edge for the time being at 10a. The circular configuration of the pillar 14 ensures that it engages only the centre portion of the side 16 and hence avoids damage to the cutting edge 10. The pillars may be removed by means of a drift or punch inserted through holes 17.

An annulus or cover ring 18 is provided over the pillars and is held by clamp screws 19.

Recesses or gullets 20, 21 are provided in the body ahead of the radial and circumferential cutting edges 10 to receive chips or cuttings.

In the modification shown in FIGURES 4 and 5 the rib 12 is replaced by a pin 30 inserted in a socket in the body 1. The pin projects through the side wall of the socket to support the blade. The pin is embraced by the socket around more than a semi-circle so that it remains firmly held in place when the blade is removed.

With reference to the single point tool shown in FIGURES 6 and 7, the tool body or shank 40 is provided with a step 41, in which is located a square cutting blade 42. The blade is located and held within the step by a clamping member 43 attached at one end to the tool shank by a screw 50, the clamping member holding the blade in engagement with the sides 44 and 45 of the step 41. The blade 42 is the same as each of the blades of the milling cutter described above, the blade having both its cutting edges and its reserve cutting edges which are interchangeable. Similarly the method of location of the blade 42 within the step 41 is the same as for the blades of the milling cutter, the bottom or side 44 of the step 41 having an upstanding rib 46 and a stop or pillar 47 removably held in a socket in the tool body or shank. The position of the rib and the configuration of the stop or pillar is such that they engage only the centre portions of their respective sides of the blade such that they avoid damage to the several cutting edges.

FIGURE 8 shows a form of location for the blade 42 which differs slightly from that shown in FIGURES 6 and 7. In this figure the blade is shown located in the step 41 by the stop or pillar 47 and the rib 46 but with the stop or pillar inserted in a through socket on the side 44 of the step and the rib formed on the side 45 of the step. This modification of the location of the blade facilitates the removal of the stop or pillar.

In the above example of the single point tool the blade has been shown located in a step. However, the invention also includes the construction in which the blade is located in a slot and held therein by a wedge and clamping screw in place of a clamping member.

It is to be appreciated that the details of the invention may be applied to other types of cutters (e.g. side and face cutters). Also it is not limited to four-sided cutting blades. The blades may be of other shapes such as triangular, or with more than four sides, or circular. It is not essential that the blades are held by wedges behind the blades, as shown. The wedges may be in front of the blades or other clamping means may be used.

In the examples as shown in the drawings, the blade or blades have positive rake angles in respect to both the radial and circumferential cutting edges. However either or both of these edges can be given a negative rake angle. Furthermore in the case of the milling cutter the drawings show the circumferential and radial cutting edges as being respectively parallel to the axis of rotation and in a plane perpendicular to the axis. They may however be oblique to the axis and in planes which are not perpendicular to the axis. Again, whereas the drawings show both cutting edges as having clearance angles, one or each may have square edges without clearance.

It is not essential that the support pins be of round section. They may be of other shapes (e.g. square or triangular) and in that event they may be arranged either so that an angle or a narrow face engages the blade.

I claim:
1. A milling cutter comprising in combination a rotatable body, a peripheral rib around said body, a plurality of separately constructed cutting blades held respectively in a like number of longitudinal slots each passing completely through said rib, each of said blades having along at least one side thereof a cutting edge projecting from one side of the rib and each blade being positioned, as to its cutting edge, by a separately constructed pin of circular cross-section, a portion of the longitudinal surface of each of said pins positioning and supporting a side of the associated blade at the other side of the rib, said pins being inserted respectively within bores of corresponding diameter provided in the body and being disposed respectively adjacent and parallel to substantially the full length of the said blade sides and in line contact therewith, and a separately constructed ring shaped for releasable attachment to said body and disposed around the body adjacent said rim so as to lie in supporting engagement with said pins.

2. A milling cutter as claimed in claim 1 in which the bottom of each slot is provided with a second pin held firmly within the body, each of said second pins engaging one of the sides of the associated blade held in the slot.

References Cited by the Examiner
UNITED STATES PATENTS

| | | | |
|---|---|---|---|
| 2,805,469 | 9/1957 | Greenleaf. | |
| 2,814,854 | 12/1957 | Murray. | |
| 2,999,301 | 9/1961 | Conti | 29—96 |
| 3,056,186 | 10/1962 | Greenleaf | 29—96 X |
| 3,104,453 | 9/1963 | Greenleaf | 29—105 |
| 3,123,896 | 10/1964 | Wilson | 29—105 X |
| 3,188,718 | 6/1965 | Wezel | 29—105 |

FOREIGN PATENTS

| | | |
|---|---|---|
| 1,208,907 | 9/1959 | France. |
| 953,769 | 4/1964 | Great Britain. |
| 596,664 | 8/1959 | Italy. |

WILLIAM W. DYER, Jr., *Primary Examiner.*

HARRISON L. HINSON, *Examiner.*